United States Patent

Poledna

[11] Patent Number: 5,974,346
[45] Date of Patent: Oct. 26, 1999

[54] METHOD FOR CONTROLLING TECHNICAL PROCESSES

[75] Inventor: Stefan Poledna, Vienna, Austria

[73] Assignee: Robert Bosch GmbH, Stuttgart, Germany

[21] Appl. No.: 08/836,454

[22] PCT Filed: Nov. 25, 1995

[86] PCT No.: PCT/DE95/01665

§ 371 Date: May 1, 1997

§ 102(e) Date: May 1, 1997

[87] PCT Pub. No.: WO96/19759

PCT Pub. Date: Jun. 27, 1996

[30] Foreign Application Priority Data

Dec. 21, 1994 [DE] Germany ............... 44 45 651

[51] Int. Cl.⁶ .................................................. G06F 7/70
[52] U.S. Cl. .............................. 701/1; 395/876; 395/854
[58] Field of Search ................................ 701/1; 395/876, 395/854

[56] References Cited

U.S. PATENT DOCUMENTS 5,507,004  4/1996  Mito ...................................... 395/854
5,544,054  8/1996  Kayano et al. ........................ 701/1
5,699,250  12/1997 Kobayashi ............................ 701/1
5,732,368  3/1998  Knoll et al. .......................... 701/1
5,768,625  6/1998  Muramatsu et al. .................. 701/1

OTHER PUBLICATIONS

Bernd Ackermann, Requirements For A Real–Time Operating System for "Embedded Systems", Electronics, No. 18, 1992, pp. 120–128.

Primary Examiner—William A. Cuchlinski, Jr.
Assistant Examiner—Olga Hernandez
Attorney, Agent, or Firm—Kenyon & Kenyon

[57] ABSTRACT

A method for controlling technical processes, particularly in motor vehicles, in which a microcomputer of a control device processes a complex control program. The complex control program is divided into a number of tasks (A, B, C) which can interrupt each other depending on their priority. To guarantee data consistency within a task (B), it is proposed to provide a local copy (msgx(B)) for global variables (x) which several tasks (A, B, C) can access, in addition to a global copy (msgx). The corresponding task (B) accesses the entry in the global copy (msgx) once during its processing, and updates its local copy (msgx(B)) of the variables (x). Subsequently, this task (B) works with the local copy (msgx(B)).

6 Claims, 6 Drawing Sheets

METHOD FOR CONTROLLING TECHNICAL PROCESSES

BACKGROUND INFORMATION

Modern control devices use microprocessors which are often powerful enough to process several tasks in parallel. This capacity is particularly used in systems for process control, in which a single computer fulfills several regulation and control functions at the same time. Particularly in the motor vehicle sector, control devices which must perform very complex control tasks are often used. Examples of these are engine control devices, transmission control devices, etc. In order to achieve quasi-simultaneous processing on the computer, methods are used to switch back and forth between the individual tasks. Typically, an operating system is used in the control devices for this purpose.

A method of this type is already known from the article by Bernd Ackermann, Requirements for a real-time operating system for "embedded systems", Electronics, No. 18, 1992, pages 120 to 128. This article explains important characteristics of real-time operating systems for control devices containing microcomputers. A program called a process manager is responsible for sequence control, i.e. coordination of the individual task programs. This program controls the assignment of the CPU and coordinates all the task programs that are running (tasks). The process manager allows quasi-parallel processing of several tasks, also referred to as multitasking. The process manager described in the report is designed in such a way that it can interrupt a program that is being processed, at any time, in order to start a task which is currently more important (has a higher priority) for the work of the system as a whole. The interrupted program is continued at the interruption point, as soon as processing of the program with higher priority has been completed. The method of procedure, that is where a task which is currently being processed can be interrupted at any time, is also referred to as preemptive scheduling or preemptive multitasking.

In addition, cooperative scheduling or cooperative multitasking is also known in the literature. In this type of sequence control, it is possible to switch between different tasks only at certain switching points previously established in the program. In other words, a task cannot be interrupted at a random point.

In general, it is necessary to have a data exchange between the programs which run simultaneously. For example, measured input variables or deviations from a rule are reported to other tasks usually, the data exchange between the individual tasks takes place via common memory locations, also called global variables. If a preemptive switching strategy is selected for switching between the tasks, the following problem occurs during data exchange via common memory locations:

If the task accesses the global variable at several points, the global variable can have different values at the different access points, specifically if a task with a higher priority interrupts the first program and changes the value of the global variable while it is being processed. The result is that the input variables of a program can change during processing. This can result in errors during processing. This problem is called data inconsistency. If, on the other hand, the input variables for a task do not change during the entire processing period, this represents data consistency.

SUMMARY OF THE INVENTION

The method according to the present invention, has the advantage, in comparison, that data consistency is guaranteed, in a simple manner, for a complex control program in which several tasks can interrupt each other. By ensuring data consistency, the tasks act as if they were being processed sequentially. Therefore the programs can be developed independently of whether the preemptive or cooperative strategy is selected for switching between the tasks. This in turn offers advantages for the development of control programs, particularly in porting control programs between different systems. In writing the program, it is not necessary to take into consideration whether the program is being developed for a system with a preemptive or a cooperative switching strategy, or whether the program is intended to be an interrupt routine or intended for normal processing. Furthermore, testing of the developed program is significantly simplified when using the method according to the present invention. This is because it is no longer necessary to take possible changes in the input variable into consideration at every command limit in the program, rather it is sufficient to select the input variables once, at the beginning of processing.

The informational value of function simulation of quasi-parallel tasks in software development is also significantly increased by the method according to the present invention. Since function simulation always takes place sequentially, it has little informational value for a system with interrupt switching (particularly preemptive multitasking) between the tasks. The simulation program differs from the final program in its implementation, and therefore demonstrates a different behavior from the final program, if interrupt switching is used. By using the method according to the invention, however, the programs act as if they were being processed sequentially, in spite of the preemptive multitasking. Therefore it is possible to achieve the same behavior for simulation and reality.

It is advantageous that taking over the entry of the global copy of a variable into a local copy of a variable is performed by a single microcomputer command or by a sequence of microcomputer commands which cannot be interrupted. This guarantees data consistency even if an interruption by a different task occurs at precisely the moment at which a task is updating its local copy of the global variable, and the other task changes the entry in the global variable while it is being processed.

The features according to the present invention guarantee data consistency even if a task revises or recalculates the global variable and then updates the global variables.

DETAILED DESCRIPTION

Figure 1:
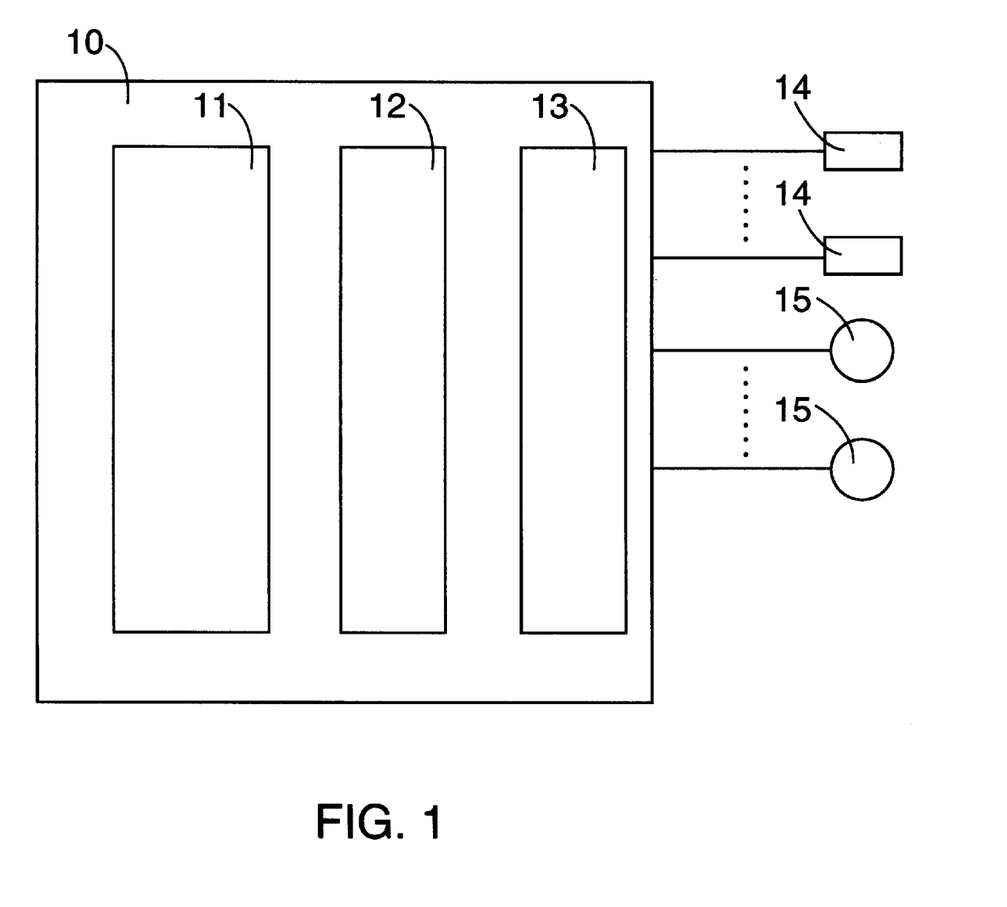
FIG. 1 shows a rough block schematic of a control device.

In FIG. 1, the reference number 10 refers to any electronic control device for controlling a technical process. The present invention is primarily intended for use in the field of automotive control devices, such as engine control devices, transmission control devices, brake control devices, air conditioning control devices, etc. However, it is not limited to this area of use and can also be used for any electronic control device for controlling complex control processes, chemical processes, machine tool controls, washing machine controls, etc. The reference number 11 refers to the microcomputer of the control device 10. The reference number 12 refers to the memory arrangement of the control device 10. The memory arrangement 12 consists, for example, of a read/write memory (RAM) as well as a fixed value memory (EPROM). The reference number 13 refers to an input/output unit of the control device 10. All the circuits for measurement value acquisition as well as for controlling certain outputs are contained in this unit. In particular, an analog/digital converter as well as an interrupt logic can be contained in the input/output unit. Sensors 14 and actuators 15 are connected with the control device 10. The actual structure of such a control device is sufficiently known to a person skilled in the art, from the state of the art, so that it will not be discussed in further detail below. In the following, the problem of data inconsistency when processing several tasks which are allowed to preemptively interrupt each other will be discussed using FIGS. 2 and 3.

Figure 2:
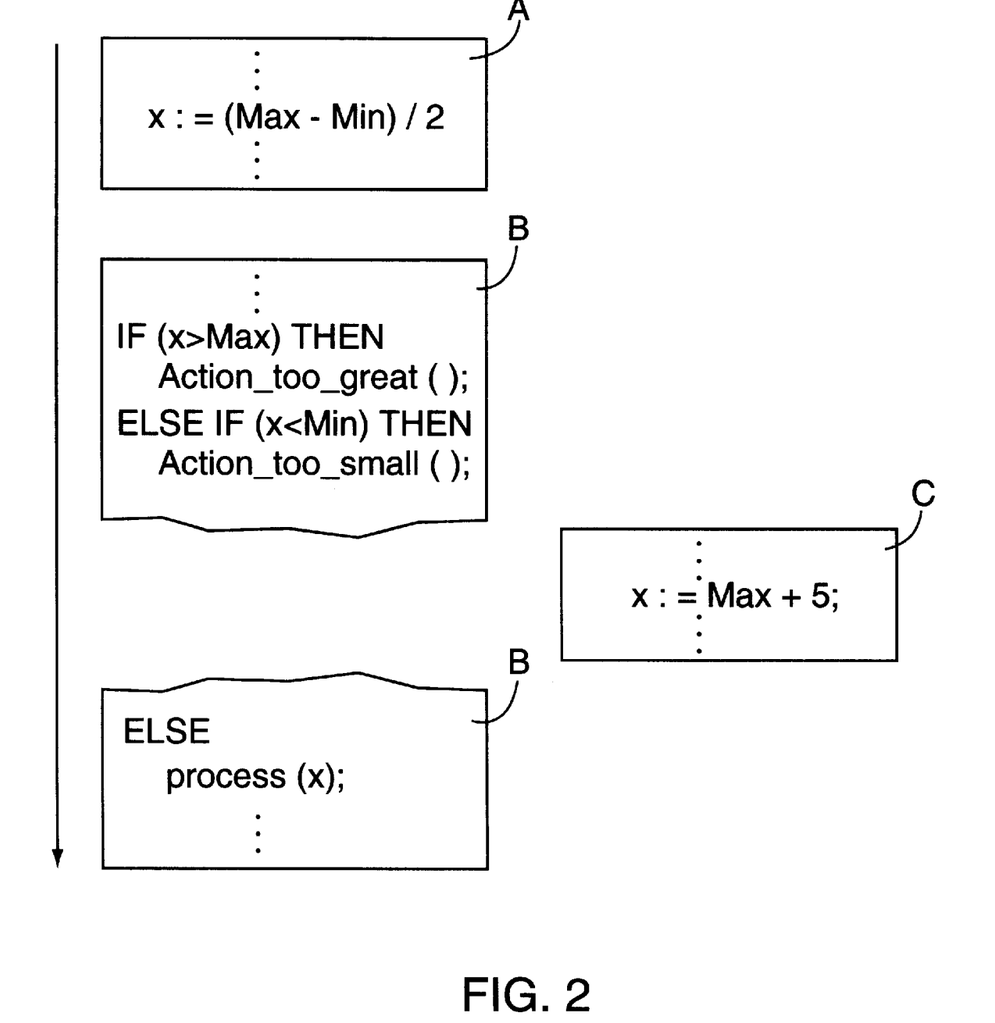
FIG. 2 shows a first example of a program sequence in which data consistency is not ensured.

FIG. 2 shows a segment of a program sequence of the control device 10. A first task is indicated with the reference symbol A. The reference symbol B refers to a second task. The reference symbol C refers to a third task. Tasks A, B, and C are processed under the control of an operating system. In this connection, the sequence of processing is by no means always the same. Task A can be called up in a certain time grid, for example. Task A can be called up in a different time grid than task B, for example. Task C can be structured as an interrupt program, so that it is processed only after an interrupt request. The sequence of processing the tasks is marked with an arrow in FIG. 2. First, task A is processed. An instruction in task A, that a variable X is set to the value (Max-Min)/2, is a process step which is particularly emphasized. In this connection, the variable X is a global variable, which tasks B and C can also access. The global variable can be any measured value, such as engine speed, engine temperature, throttle valve angle, intake air mass, etc., for example. However, it can also be a calculated value, such as operational unrest. After task A has been processed, task B is processed next. Then, if necessary after several prior instructions, the instruction is issued that if the current value of the variables X is greater than a certain maximum value Max, the instruction action_too_great ( ) is performed. If, on the other hand, the value is less than a pre-determined minimum value Min, the instruction action_too_small ( ) is to be performed instead. Since the global variable was previously set to (Max-Min)/2 in task A, none of the conditions mentioned above will be fulfilled and the action Process(x) could be performed. However, this instruction is not processed, because first task C interrupts the processing of task B. The global variable x is also changed in task C. It is set to the value Max+5. After task C has then been completed, task B is continued at the interrupted point and the instruction Process(x) is performed. Therefore the case occurs that task B resumes the processing function with an invalid input variable x when it continues. As a rule, this will result in an undesirable control/regulation progression. In motor vehicle technology, in particular, for example in engine control, in which optimum exhaust gas values and the lowest possible fuel consumption are decisive factors, such incorrect settings are especially harmful.

Figure 3:
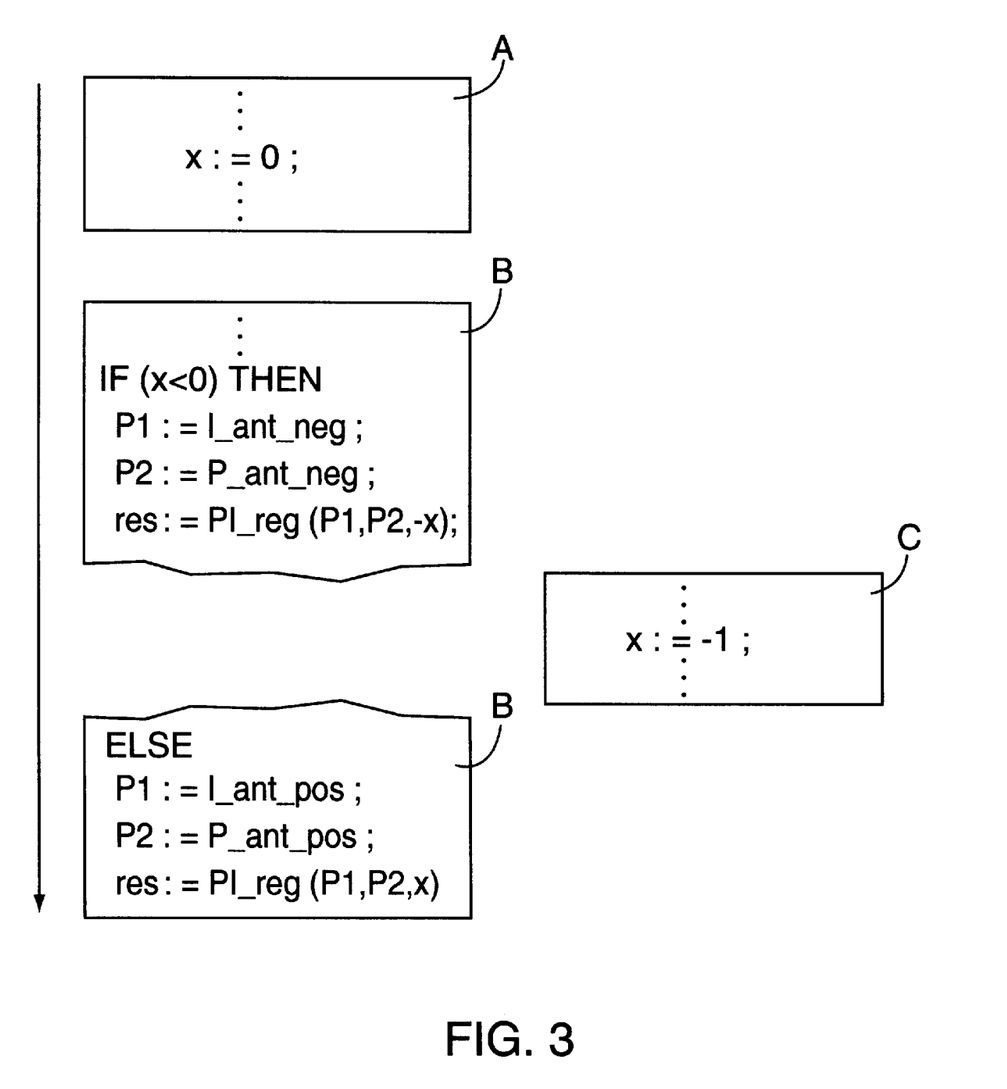
FIG. 3 shows a second example of a program sequence in which data consistency is not ensured.

FIG. 3 shows another example of a data inconsistency which can occur. In this case, the instruction to set the global variable x to zero is given in task A. In task B, which is processed subsequently, a case differentiation is made as to whether the variable x has a value less than zero or whether it is present as a positive value. Then, different processing steps are performed as a function of the positive or negative sign. Since the variable x was set to zero in the preceding task A, the processing branch for a positive sign of the if-then-else instruction would have to be performed. However, direct processing of the else branch does not occur, because task C interrupts task B. However, in task C the variable x is set to the value −1. During subsequent processing, the else branch of task B, in other words the branch for a positive sign of x is performed, although the x variable has become negative in the meantime. In other words, here again there is data inconsistency for task B.

As a third example of the occurrence of data inconsistency, we will mention a read/write operation for an input variable which is not completed with a single read/write operation. For example, in the case of microcomputers which can process only 16-bit memory words, access to a 32-bit memory word must be performed with two read operations. If the program is interrupted between these two operations, and the 32-bit wide word is rewritten, then the 16-bit wide part with the higher value and the 16-bit wide part with the lower value each belong to a different value. The resulting 32-bit wide input value is inconsistent and therefore an error.

The problem of data inconsistency is made more difficult by the fact that in a complex control program, there are many potentially possible process sequences and interruption points, since the program can potentially be interrupted after each individual instruction. For testing such a control program, it is almost impossible to run through all the possible combinations of process sequences and interruption points, and to ensure, in each instance, that the program will work correctly under all conditions.

The present invention sets itself the goal of guaranteeing data consistency in such a complex control program, by means of suitable measures.

According to the invention, local copies are made for all global variables which are input variables for one or more tasks and which can be changed by a different task during the program sequence. The corresponding task then accesses the local copy of the global variables in each instance, as it is processed further. It is a prerequisite that each task can only access its own local copy. Under these conditions, data consistency for the task in question is assured. In other words, in addition to the global copy of an input variable or global variable, local copies for specific tasks are also made. If a task utilizes the input variable, the value of the input variable is read from the global copy at the beginning or at another desired point in time, in a write operation that cannot be interrupted, and copied to the corresponding local copy of the task in question. A task which accesses the input variable not only in read mode, but acquires the input variable itself, or calculates it from other variables, can also access the global variable, i.e. the global copy, in write mode. This write operation is also supposed to take place in a block which cannot be interrupted by any other task. This is achieved, for example, in that all the interrupt requests are blocked before the write operation mentioned, so that an interrupt program cannot perform an interruption. After the write operation, the interrupt requests can be released again. The method will be explained in greater detail below, on the basis of FIGS. 4 and 5.

Figure 4:
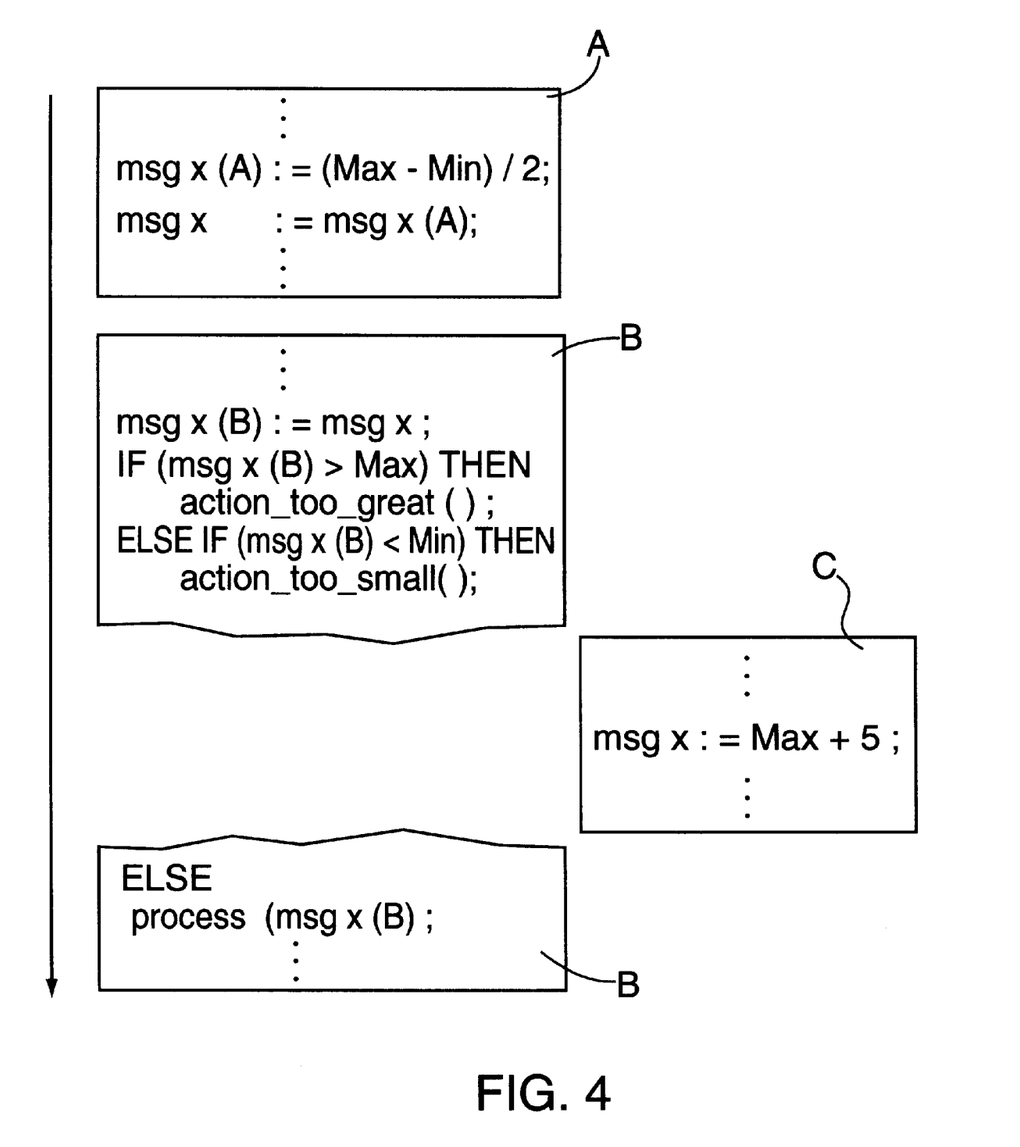
FIG. 4 shows the program sequence according to the first example, where in this case data consistency is guaranteed.

FIG. 4 contains the same exemplary program sequence as FIG. 2. When processing task A, however, first the local copy msgx(A) is set to the value (Max-Min)/2 at the corresponding point. Only afterwards is the entry of the local copy msgx(A) taken over into the global copy msgx, in a single, uninterruptible write operation. This write operation, finally, consists of a single microcomputer command, which can no longer be interrupted. Therefore no interrupt requests have to be blocked before the write operation. During the subsequent processing of task B, the entry in the global copy msgx is first taken over into the local copy msgx(B) of task B, for the global variable x, before the if-then-else instruction which is subject to possible error. This operation again is an uninterruptible write operation. Subsequently, task B works only with the local copy msgx(B). This means that data inconsistency cannot occur, even if task C rewrites the global copy msgx during its processing. This is because task C has no access to the local copy msgx(B).

Figure 5:
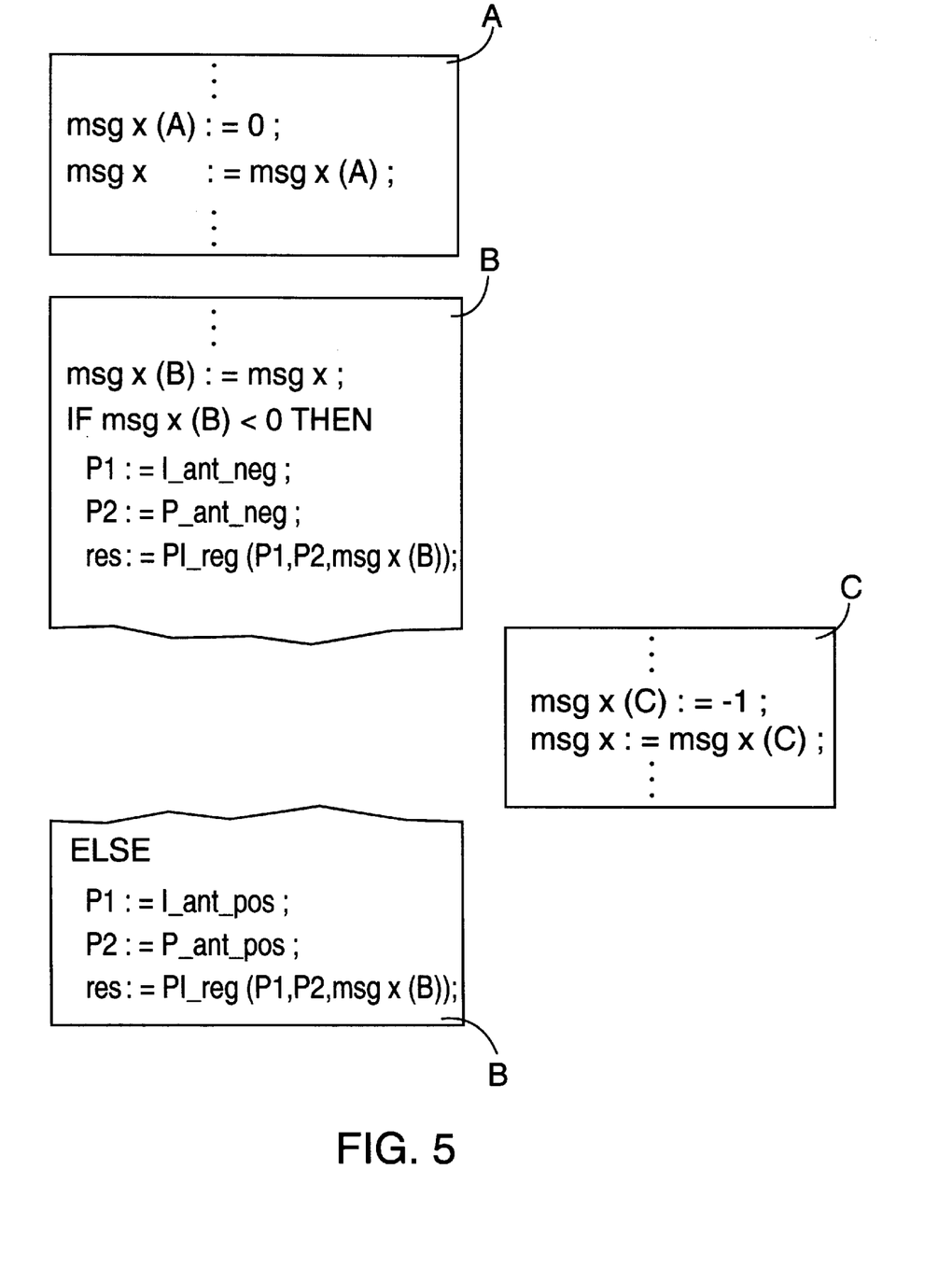
FIG. 5 shows a program sequence according to the second example, where in this case data consistency is guaranteed.

According to FIG. 5, task A writes the local copy msgx(A) as having the value of zero during its processing. Subsequently, the value of the local copies msgx(A) is again written to the global copy msgx. Again, the write process is not interruptible, as explained in the description of FIG. 4. When task B is processed, the value in the global copy msgx is again taken into the local copy msgx(B), before the critical if-then-else instruction. Then, during further processing of task B, only the local copy msgx(B) is used. Even an interruption by task C, with the global variable msgx being rewritten while that task is processed, will not result in data inconsistency.

Figure 6:
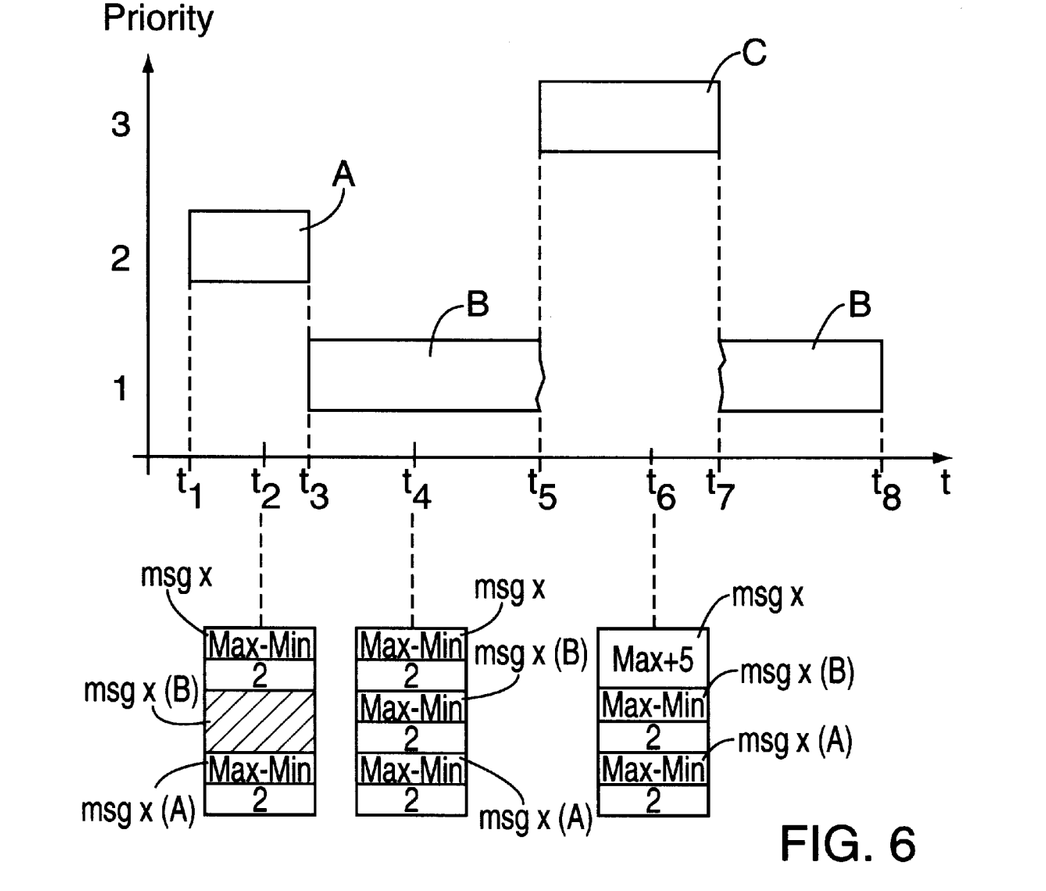
FIG. 6 shows a schematic representation of the program sequence according to the present invention, according to FIG. 4.

FIG. 6 shows the program sequence according to FIG. 4 again, in a different form. Processing of task A starts at the time $t_1$. At the time $t_2$, the value (Max-Min)/2 is entered both in the local copy msgx(A) and the global copy msgx. Any desired value can be entered in the local copy msgx(B) for task B, as indicated with the hatched lines. Task A is completed at the time $t_3$. At the time $t_4$, task B has also taken the value from the global copy msgx into its local copy msgx(B). At the time $t_5$, task C interrupts processing of task B. In the example being considered here, task C has the highest priority, as is evident from the ordinate of the coordinate cross. Task C itself cannot be interrupted, therefore no local copy for the variable x is provided for task C. At the time $t_6$, task C has rewritten the value of the global copy msgx with the new value Max+5. At the time $t_7$, processing of task C has been completed. Subsequently, the interrupted task B is continued at the interruption point. At the time $t_8$, processing of task B is also completed. Between the times $t_6$ and $t_8$, the entries in the local copies and the global copy for the variable x are no longer changed.

Figure 7:
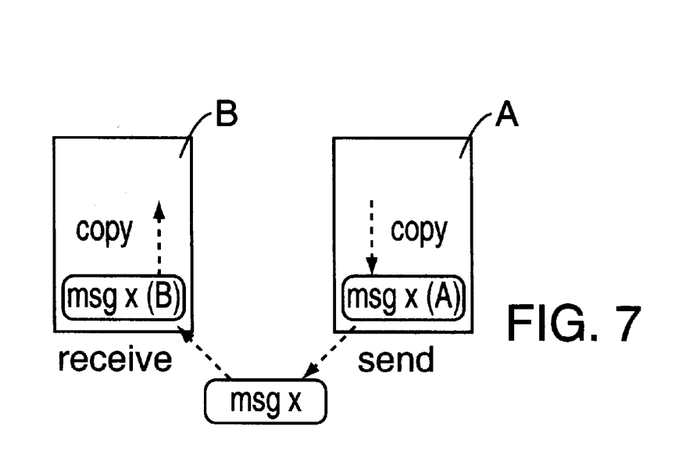
FIG. 7 shows a schematic representation of the data exchange between two tasks, according to the invention.

In FIG. 7, the reference symbol A refers to a task where the input variable x is re-determined during processing of the task. Task A then first stores the newly determined input variable in its local copy msgx(A). Subsequently, the value is also copied to the global copy msgx. This copying process is also referred to as a send process. During subsequent processing of task B, this task takes the entry in the global copy msgx over into its local copy msgx(B). This copying process is also referred to as a receive process.

Depending on how many tasks are contained in the complex control program, what input variables are processed by the various tasks, what tasks can interrupt other tasks, and what tasks cannot be interrupted, there are various possibilities for optimizing the control time and running time requirements of the complex control program. The following criteria must be particularly observed: Local copies only need to be made if one program A can interrupt another program B and if both programs have access to the same variable. In all other cases (for example in the case of cooperative multitasking with other programs), no local copies are necessary, since access to the variable then takes place like access to a global variable.

If program A interrupts program B, and if program A is the recipient of data from the global copy and program B is the sender of the data to the global copy, and if, in addition, the send and receive processes are performed with uninterruptible operations, no local copies have to be made, either. Since the sender cannot interrupt the recipient, data consistency is guaranteed.

If program A interrupts program B, and if program A is the sender of the newly determined data and program B is the recipient of the newly determined data, and if the send and receive processes are performed with uninterruptible operations, program A does not need a local copy. The write operations of program A cannot be interrupted, and therefore task B can always access consistent data.

If tasks A to N are interrupted by a task S, where the tasks A to N cannot interrupt each other, and, according to FIG. 7, task S is the sender of the data and tasks A to N are senders or recipients, tasks A to N can all use the same local copy. Since tasks A to N run sequentially, they can use the same memory location for the local copy. In all the optimization possibilities indicated above, data consistency is ensured. It is therefore practical to integrate the mechanism for data exchange between two tasks in an operating system which selects the optimum implementation of send and receive processes, in terms of running time and memory, as a function of the conditions in each instance. The operating system can then decide whether a send or receive request will result in a copying action to a local copy, or whether a copying action is not necessary. Likewise, the operating system can decide whether access to the variable can take place directly via the global copy, or whether access must take place via the local copy of the task.

In the examples described, fixed priorities are assigned to the tasks A, B, and C. However, the priority of processing tasks can also be recalculated by an operating system after activation of a task, in each instance. For this purpose, a time can be assigned to each task, for example, within which the task has to be completed. Then it can happen, when the task is activated, that the operating system continues processing the task already started, or that it interrupts the task that was started and processes the newly activated task. The operating system makes its selection depending on which of the activated tasks must be processed first. In these cases, the priority of a task therefore increases as it is waiting to be processed.

What is claim is:

1. A method for controlling a technical process using a microcomputer of a control device processing a complex control program having at least one input variable, the method comprising the steps of:

dividing the control program into a plurality of tasks, wherein each one of the plurality of tasks has a fixed priority and at least one assigned activation event;

writing the at least one input variable as a global variable copy;

activating at least one of the plurality of tasks;

writing the global variable copy as a local variable copy for each one of the at least one activated task;

selecting one of the at least one activated task for processing, wherein the local variable copy is accessed;

interrupting the processing of the one of the at least one activated task until completion of a one of the plurality of tasks which has a higher fixed priority than the one of the at least one activated task; and continuing the processing of the one of the at least one activated task which was interrupted.

2. The method according to claim 1, wherein at least one of the writing steps is performed by an uninterruptible microprocessor command.

3. The method according to claim 1, wherein at least one of the writing steps is performed by an uninterruptible sequence of microprocessor commands.

4. The method according to claim 2, further comprising the step of blocking an interrupt request before the uninterruptible microprocessor command is processed.

5. The method according to claim 4, wherein the interrupt request activates an interrupt processing program, write access to the at least one input variable occurring during the interrupt processing.

6. The method according to claim 1, wherein the technical process is performed in a motor vehicle.

\* \* \* \* \*